United States Patent [19]

Guest

[11] Patent Number: 4,606,783
[45] Date of Patent: Aug. 19, 1986

[54] TUBE COUPLINGS

[76] Inventor: John D. Guest, "Iona", Cannon Hill Way, Bray, Maidenhead, Berkshire, United Kingdom

[21] Appl. No.: 557,079

[22] Filed: Dec. 1, 1983

[30] Foreign Application Priority Data

Dec. 13, 1982 [GB] United Kingdom ................ 8235474

[51] Int. Cl.⁴ .................... F16L 17/02; F16L 47/02
[52] U.S. Cl. ...................................... 156/73.1; 285/55; 285/238; 285/286; 285/323; 156/294
[58] Field of Search ............... 285/323, 238, 55, 286, 285/423; 156/73.1, 294

[56] References Cited

U.S. PATENT DOCUMENTS

| | | | |
|---|---|---|---|
| 2,776,151 | 1/1957 | Harkenrider | 285/238 X |
| 3,002,871 | 10/1961 | Tramm et al. | 285/21 X |
| 3,516,690 | 6/1970 | Kreig | 285/55 |
| 3,653,689 | 4/1972 | Sapy et al. | 285/322 X |
| 3,722,924 | 3/1973 | Bjornsen | 285/55 |
| 3,743,326 | 7/1973 | Courtot et al. | 285/323 X |
| 3,999,783 | 12/1976 | Legris | 285/323 X |
| 4,059,294 | 11/1977 | Falcone | 285/238 |
| 4,178,023 | 12/1979 | Guest | 285/323 |
| 4,220,361 | 9/1980 | Brandenberg | 285/323 |

Primary Examiner—Thomas F. Callaghan
Attorney, Agent, or Firm—Beveridge, Degrandi & Weilacher

[57] ABSTRACT

In a tube coupling of the kind comprising a body member with a bore having an axially tapered portion, a collet having arms extending into said portion of the bore, the tapered portion being such that axially outward movement of the collet arms engaging the tapered portion causes the collet arms to be pressed inwardly for gripping a tube in the bore, the body member is formed of inner and outer parts, at least the inner part being of plastics material which is, by ultrasonic vibrations, caused to enter into recesses, grooves, serrations or the like in an outer part.

8 Claims, 4 Drawing Figures

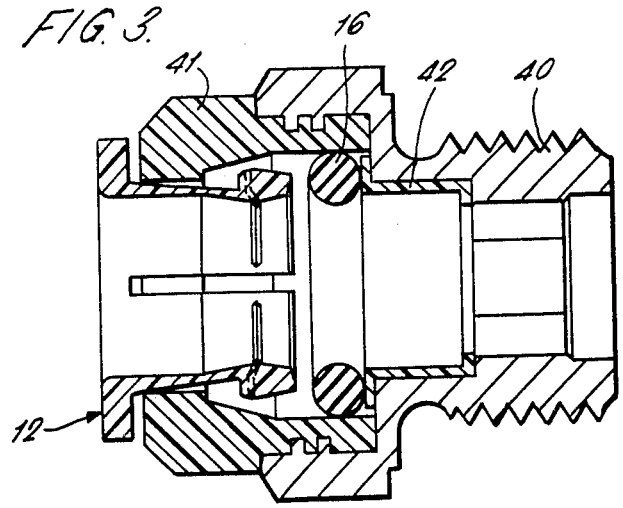
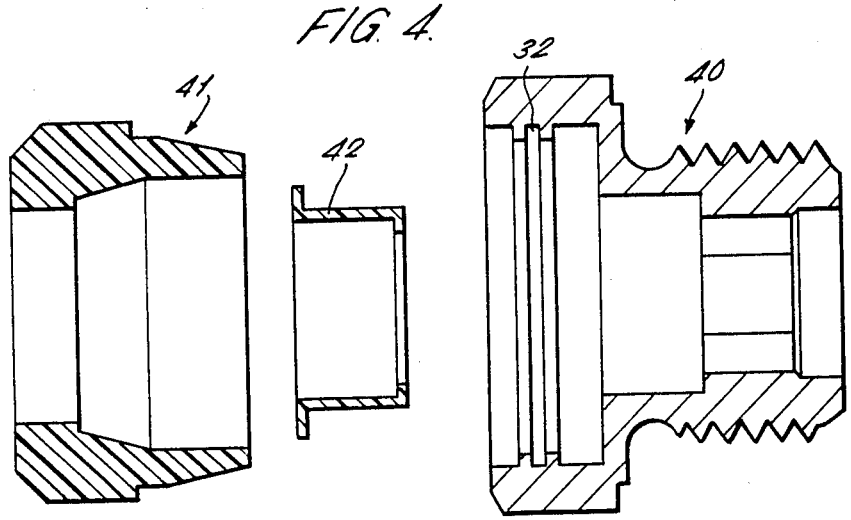

TUBE COUPLINGS

BACKGROUND OF THE INVENTION

1. Field of the Invention

This invention relates to tube couplings of the kind comprising a body member with a bore having an axially tapered portion co-operating with arms of a collet extending into said portion of the bore, the tapered portion being such that axially outward movement of the collet arms engaging the tapered portion causes the collet arms to be pressed inwardly for gripping a tube in the bore.

2. Prior Art

Tube couplings of the kind described above are known for example from U.S. Pat. No. 4,005,883 and U.S. Pat. No. 4,178,023.

SUMMARY OF THE INVENTION

It is an object of the present invention to provide an improved method and form of construction for such coupling members.

According to the present invention, in a tube coupling of the kind described above, the body portion comprises an inner part of moulded plastics material defining at least the tapered portion of said bore and an outer part extending around the inner part, with the plastics material of the inner part entering into and engaging recesses, grooves or serrations or the like in the outer part to key the two parts together.

The invention also includes within its scope a method of manufacturing a tube coupling of the kind described above wherein the body portion is formed of a moulded plastics inner part defining at least the tapered portion of the bore which moulded plastics part is inserted in an outer part extending around the plastics material of the inner part, the outer part having recesses, grooves, serrations or the like and ultrasonic vibration is applied to the assembly to soften or melt the plastics material of the inner part to deform it into locking engagement with said recesses, grooves, serrations or the like.

The present invention enables the body portion of a coupling to be formed of two materials. The outer part, in many constructions, is of metal. However, as will be explained later, the present invention also has advantageous use where both the inner and outer parts are of plastics material. Tube couplings commonly have to be formed as component parts of larger fittings and this outer part may be a complex structure. In many cases however it is a fitting or component having, for example, screw threads for securing into a structure and it is commonly desirable in such cases to have the body part of the coupling formed of metal. The inner part of the coupling however is formed of plastics material and may for example readily be made of an inner plastics material suitable for handling of foodstuffs, beverages and the like which have to be safeguarded against any possible contamination such as might arise from corrosion of the metal. The invention permits the plastics and metal parts to be securely and firmly fixed together.

Particularly if the outer part is of metal, it may be desired to provide a plastics lining or bush in a further length of a bore through the body portion in addition to said inner part of plastics material. Thus a further plastics lining or bush may be employed, which may remain a separate element or which may be ultrasonically welded to the outer metal portion.

A further advantage of the above-described technique is that couplings may be made to take a wide variety of different tube sizes by the use of appropriate sized collets and by securing the plastics inner part in a standard sized outer part. The moulded plastics inner parts could be made in a range of sizes suitable to accommodate the various sized tubes which might be used but may be of standard external dimensions. Such inner parts can then be used with a wide range of different outer portions to form for example T-joints, elbows etc. The inner parts may be used with outer portions of different materials to suit different industries. This construction thus facilitates the provision of the required wide ranges of fittings of different materials and different sizes used in the engineering, food processing and other industries. Thus, even for fittings wholly of plastics material, the use of the two-part construction leads to substantial economy of manufacture in providing a wide range of different fittings.

In the constructions described above, the collet is preferably made with sufficient gaps between its arms that it can be inserted into said inner part after the latter has been secured in the outer part. Such a collet can have, as described in U.S. Pat. No. 4,005,883, a head lying outside the bore of the body portion, so facilitating axial movement of the collet when a tube is to be released from the coupling.

BRIEF DESCRIPTION OF THE DRAWINGS

FIG. 3 is a view similar to FIG. 1 but of a modified form of coupling; and

FIG. 4 is an exploded view of the component parts of the coupling body of FIG. 3 before assembly.

DESCRIPTION OF THE PREFERRED EMBODIMENTS

Figure 1:
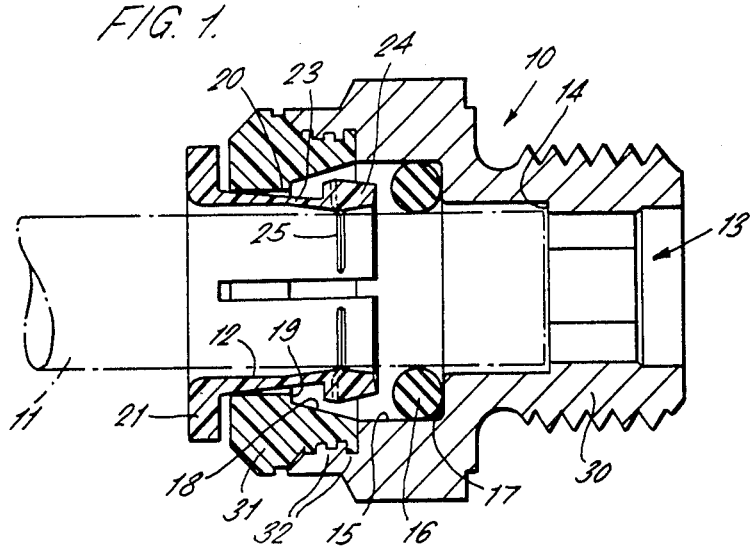
FIG. 1 is a longitudinal section through a construction of tube coupling constituting one embodiment of the invention.
Figure 2:
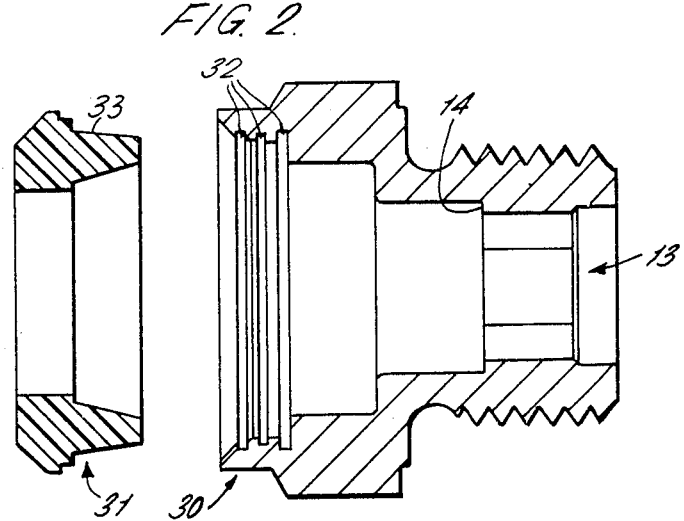
FIG. 2 is an exploded longitudinal section showing the two parts of the coupling body of FIG. 1 before assembly.

Referring to FIGS. 1 and 2 there is shown a tube coupling comprising a coupling body 10 for effecting a coupling to a tube 11 using a collet 12. A bore 13 extends through the coupling body and has a shoulder 14 forming an end stop to the tube 11 when inserted in the coupling. An enlarged diameter portion 15 of the bore contains an O-ring or other similar seal 16 which abuts against a shoulder 17 in the collet body and which, in use, seals against the external surface of the tube 11 and against the internal wall of the enlarged diameter portion 15 of the bore of the coupling. This enlarged diameter portion 15, towards the end from which the tube 11 is inserted, has a tapered portion 18 tapering to a narrow diameter in the axially outward direction, this taper being terminated by an internally facing shoulder 19 between the tapered portion 18 and a narrower diameter entry portion 20. Within this part of the coupling body is the collet 12 which is formed with an outer ring portion 21 lying outside the coupling body which ring portion is formed integrally with a plurality of collet arms, typically four arms 23, formed of resilient material. These arms are of generally arcuate shape to embrace the tube 11. Towards their inner ends, the collet arms are formed with a head portion 24 having a tooth element 25 extending radially inwardly to abut against and bite into the tube 12 to be gripped. Conveniently the collet 12 is formed of plastics material with the tooth element 25 constituted by a metal insert embedded in the plastics material of the collet. The head portions 24 on the ends of the collet arms are forced slightly outwardly, against the resilience of the arms, when a tube 12 is inserted in the collet. These head portions will thus engage against the tapered portion 18 of the bore in the coupling body when a tube is inserted in the collet and if the collet is then moved axially outwardly, that is to say to the left in FIG. 1, this engagement with the tapered portion 18 of the coupling body causes the collet to grip the tube more tightly as the tube and collet are pulled outwardly. The shoulder 19 forms a stop engaging the head portions 24 preventing withdrawal of the collet when a tube is within the coupling.

The coupling body 10 is formed of two parts. In this particular embodiment one part 30 is made of metal, e.g. brass, and the other part 31 is formed of moulded plastics material. The part 31 defines the taper section of the bore which is a section where dimensional tolerances are important in a coupling of this kind. The metal part 30 extends around the plastics part 31 for a short length thereof and, in this region, the metal part 30 is formed with a series of annular grooves 32. The plastics part 31 is moulded with a straight taper 33 on its outer surface as seen in FIG. 2, so that it can be inserted into the metal part. The two portions are then joined together by applying ultrasonic vibration. The technique may be considered as ultrasonic welding in that the plastics material softens and deforms into the grooves 32 in the metal part keying and locking the two parts together.

With this construction, the coupling has a body portion predominantly of metal and which therefore can give the required structural strength. The metal of the coupling body may be part of a larger structure or it may be shaped to join on to or be connected to a larger metal structure, for example it may have a screw thread or the like. The metal portion 30 will have adequate strength for this purpose. The plastics portion 31 on the other hand can be moulded accurately to define the tapered internal bore and, by the ultrasonic welding technique, can be securely fixed into the metal portion despite the different coefficients of thermal expansion of the metal and plastics material. The brass has a much higher coefficient of thermal expansion yet is firmly secured around the plastics material. It is thus possible to have an internal plastics element as described above with the external metal structure. This technique thus enables a wide range of fittings to be made using standardised plastics inserts with different sized inserts for different sized tubes. These inserts may be put into a wide range of different metal outer elements to form different fittings.

In assembling the structure, the inner part is fixed in the outer part to form a body assembly, the O-ring 16 is put in place and the collet is then inserted axially into the bore. The collet arms are sufficiently widely spaced, as described in the U.S. Pat. No. 4,005,883, that, in the absence of a tube 11, the head portions can be forced radially inwardly sufficiently to pass through the entry portion 20. This permits of using a collet with a head 24 extending radially outwardly to be of larger diameter than the entry portion 20 of the bore, thereby facilitating axial movement of the collet, as is required, for example, if the collet is to be pushed axially inwardly to release a tube from the coupling.

FIGS. 3 and 4 illustrate a modification of the above-described arrangement in which the coupling body is formed of a metal outer part 40 with a first inner plastics part 41 (corresponding to part 31 of FIGS. 1 and 2) and a further plastics bush 42 forming a lining for another part of the bore of the metal part 40. In the particular embodiment illustrated, the bush 42 is a separate component and is inserted into the metal part either before or after the part 41 is inserted and ultrasonically welded. The part 42 may in some cases be ultrasonically welded in position. If this is to be done, it may be secured by recesses or grooves in the metal in a similar manner to the part 31 of FIGS. 1 and 2 and it would preferably be welded in position before the part 41 is inserted. After the body portion has been completely assembled, the O-ring and collet may be put in position as in the embodiment of FIGS. 1 and 2.

It will be noted the use of two plastics components 41 and 42 facilitates the manufacture of a wide range of fittings as these components may be standardised for assembly in a range of metal fittings constituted by the outer part 40.

I claim:

1. A method of making a tube coupling, wherein said method comprises providing an outer part having a bore for receiving a tube, wherein the outer part comprises a first end through which the bore passes, a step in the bore facing and spaced from the first end, and axially spaced annular recesses encircling the bore between the step and the first end;

providing an annular molded plastics inner part having a head portion, and insert portion with an end face, and an opening through the inner part having an axially tapered inner annulus, wherein the molded plastics part has an outer surface tapering toward the end face between the head portion and the end face;

inserting the molded plastics inner part in the bore of the outer part so that the head portion of the inner part overlies and abuts the first end of the outer part, the end face of the inner part abuts the step in the bore of the outer part, and the tapered outer surface of the inner part overlies the recesses in the bore;

applying ultrasonic vibration to soften or melt the plastics material of the inner part to deform the outer tapered surface of the plastics part into the annular recesses in the bore of the outer part;

hardening the plastics material to form a locking engagement between the inner part and recesses of the outer part;

providing a collet having arms; and inserting the arms of the collet into said tapered inner annulus of the plastics part, wherein the tapered portion is such that axially outward movement of the collet arms results in the collet arms engaging the inner tapered annulus thereby causing the collet arms to be pressed inwardly for gripping a tube in the bore.

2. A method as claimed in claim 1 wherein the outer part is of metal.

3. A method as claimed in claim 1 wherein the outer part is of plastics material.

4. A method as claimed in claim 1 wherein a further plastics bush or lining is ultrasonically welded into another part of the bore in the outer metal part.

5. A method of making a tube coupling, wherein said method comprises providing an outer part having a bore for receiving a tube, wherein the outer part comprises a first end through which the bore passes, a step in the bore facing and spaced from the first end, and axially spaced annular recesses encircling the bore between the step and the first end;

providing an annular molded plastics inner part having a head portion, an insert portion with an end face, and an opening through the inner part having an axially tapered inner annulus, wherein the molded plastics part has an outer surface tapering toward the end face between the head portion and the end face;

inserting the molded plastics inner part in the bore of the outer part so that the head portion of the inner part overlies and abuts the first end of the outer part, the end face of the inner part abuts the step in the bore of the outer part, and the tapered outer surface of the inner part overlies the recesses in the bore;

providing a collet having arms;

inserting the arms of the collet into said tapered inner annulus of the plastics part, wherein the tapered portion is such that axially outward movement of the collet arms results in the collet arms engaging the inner tapered annulus thereby causing the collet arms to be pressed inwardly for gripping a tube in the bore;

applying ultrasonic vibration to soften or melt the plastics material of the inner part to deform the outer tapered surface of the plastics part into the annular recesses in the bore of the outer part; and hardening the plastics material to form a locking engagement between the inner part and recesses of the outer part.

6. A method as claimed in claim 5 wherein the outer part is comprised of metal.

7. A method as claimed in claim 5 wherein the outer part is comprised of plastics material.

8. A method as claimed in claim 6 wherein a plastics lining is ultrasonically welded into another part of the bore in the outer metal part.

* * * * *